US012793505B2

(12) United States Patent
Shepherd et al.

(10) Patent No.: US 12,793,505 B2
(45) Date of Patent: *Nov. 10, 2026

(54) SYSTEM AND METHOD FOR EXCHANGING GAMING ESTABLISHMENT FUNDS FOR CHECKS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

(*) Notice: Subject to any disclaimer, the term of this patent is extended or adjusted under 35 U.S.C. 154(b) by 110 days.

This patent is subject to a terminal disclaimer.

(21) Appl. No.: 18/914,977

(22) Filed: Oct. 14, 2024

(65) Prior Publication Data

US 2025/0037544 A1 Jan. 30, 2025

Related U.S. Application Data

(63) Continuation of application No. 18/198,092, filed on May 16, 2023, now Pat. No. 12,148,267, which is a continuation of application No. 16/709,495, filed on Dec. 10, 2019, now Pat. No. 11,688,238.

(51) Int. Cl.
*G07F 17/32* (2006.01)

(52) U.S. Cl.
CPC ...... *G07F 17/3251* (2013.01); *G07F 17/3223* (2013.01); *G07F 17/3239* (2013.01); *G07F 17/3241* (2013.01)

(58) Field of Classification Search
CPC ............. G07F 17/3251; G07F 17/3223; G07F 17/3239; G07F 17/3241
See application file for complete search history.

(56) References Cited

U.S. PATENT DOCUMENTS

| | | | |
|---|---|---|---|
| 7,828,646 | B2 | 11/2010 | Franks |
| 7,976,382 | B2 | 7/2011 | Benbrahim |
| 8,023,715 | B2 | 9/2011 | Jones et al. |
| 8,216,064 | B1 | 7/2012 | Muskin |
| 8,382,583 | B2 | 2/2013 | Zinder et al. |
| 8,407,141 | B2 | 3/2013 | Mullen et al. |
| 8,556,707 | B2 | 10/2013 | Beer et al. |
| 8,595,137 | B2 | 11/2013 | Sears et al. |
| 8,958,534 | B2 | 2/2015 | Bodman |
| 9,148,569 | B2 | 9/2015 | Resende et al. |
| 9,552,573 | B2 | 1/2017 | Kulpati et al. |
| 9,672,686 | B2 | 6/2017 | Nguyen |
| 9,747,597 | B2 | 8/2017 | Wu |
| 9,990,801 | B2 | 6/2018 | Sanford et al. |
| 10,402,815 | B2 | 9/2019 | Sharma et al. |
| 2007/0087817 | A1 | 4/2007 | Beer et al. |
| 2007/0203832 | A1 | 8/2007 | Babi et al. |
| 2008/0318671 | A1 | 12/2008 | Rowe et al. |
| 2011/0264572 | A1 | 10/2011 | Cucinotta |
| 2012/0252567 | A1 | 10/2012 | Gagner et al. |
| 2013/0103582 | A1 | 4/2013 | Singfield |
| 2014/0365369 | A1 | 12/2014 | Understein |
| 2015/0080113 | A1 | 3/2015 | Yankton et al. |
| 2016/0012465 | A1 | 1/2016 | Sharp |

(Continued)

*Primary Examiner* — Werner G Garner
(74) *Attorney, Agent, or Firm* — Neal, Gerber & Eisenberg LLP

(57) ABSTRACT

Systems and methods that enable a user to obtain a check in exchange for a redemption of a ticket voucher associated with an amount of funds and/or a withdrawal of an amount of funds associated with a gaming establishment account associated with the user.

20 Claims, 5 Drawing Sheets

(56) References Cited

U.S. PATENT DOCUMENTS

| | | | |
|---|---|---|---|
| 2016/0171830 | A1 | 6/2016 | Curtin et al. |
| 2017/0092054 | A1 | 3/2017 | Petersen et al. |
| 2017/0154497 | A1 | 6/2017 | Nguyen |
| 2017/0213199 | A1 | 7/2017 | Schwartz |
| 2017/0262834 | A1 | 9/2017 | Curtin et al. |
| 2018/0047249 | A1 | 2/2018 | Nelson et al. |
| 2018/0061179 | A1 | 3/2018 | Miri et al. |
| 2018/0082529 | A1 | 3/2018 | Mchugh et al. |
| 2019/0043308 | A1 | 2/2019 | Higgins et al. |
| 2020/0111280 | A1 | 4/2020 | Cleveland et al. |

You selected a check for $453.45.

Please take the dispensed check
made out to you for $453.45.

SYSTEM AND METHOD FOR EXCHANGING GAMING ESTABLISHMENT FUNDS FOR CHECKS

PRIORITY CLAIM

This application is a continuation application of, claims priority to and the benefit of U.S. patent application Ser. No. 18/198,092, filed on May 16, 2023, which is a continuation application of, claims priority to and the benefit of U.S. patent application Ser. No. 16/709,495, filed on Dec. 10, 2019, the entire contents of which are each incorporated by reference herein.

BACKGROUND

Gaming machines may provide players awards in primary games. Gaming machines generally require the player to place a wager to activate the primary game. The award may be based on the player obtaining a winning symbol or symbol combination and on the amount of the wager. When a player cashes out a credit balance of such gaming machines, these gaming machines may provide the player with a ticket voucher redeemable for the amount of the credit balance.

BRIEF SUMMARY

In certain embodiments, the present disclosure relates to a system including a processor, and a memory device that stores a plurality of instructions. When executed by the processor responsive to an occurrence of a ticket voucher redemption event, the instructions cause the processor to identify a user associated with a ticket voucher, and determine an amount of funds associated with the ticket voucher. When executed by the processor, the instructions cause the processor to determine, based on the first amount of funds associated with the ticket voucher, a second amount of funds, and issue a check to the identified user for the second amount of funds.

In certain embodiments, the present disclosure relates to a system including a processor, and a memory device that stores a plurality of instructions. When executed by the processor responsive to an occurrence of a withdrawal event and responsive to an authorization of an amount of funds to withdraw from a gaming establishment account associated with a user, the instructions cause the processor to issue a check to the user for the authorized amount of funds, and communicate data associated with a reduction of a balance of the gaming establishment account associated with the user.

In certain embodiments, the present disclosure relates to a method of operating a system including, responsive to an occurrence of a ticket voucher redemption event, identifying, by a processor, a user associated with a ticket voucher, determining, by the processor, a first amount of funds associated with the ticket voucher, determining, by the processor and based on the first amount of funds associated with the ticket voucher, a second amount of funds, and issuing a check to the identified user for the second amount of funds.

Additional features are described herein, and will be apparent from the following Detailed Description and the figures.

DETAILED DESCRIPTION

Figure 1A:
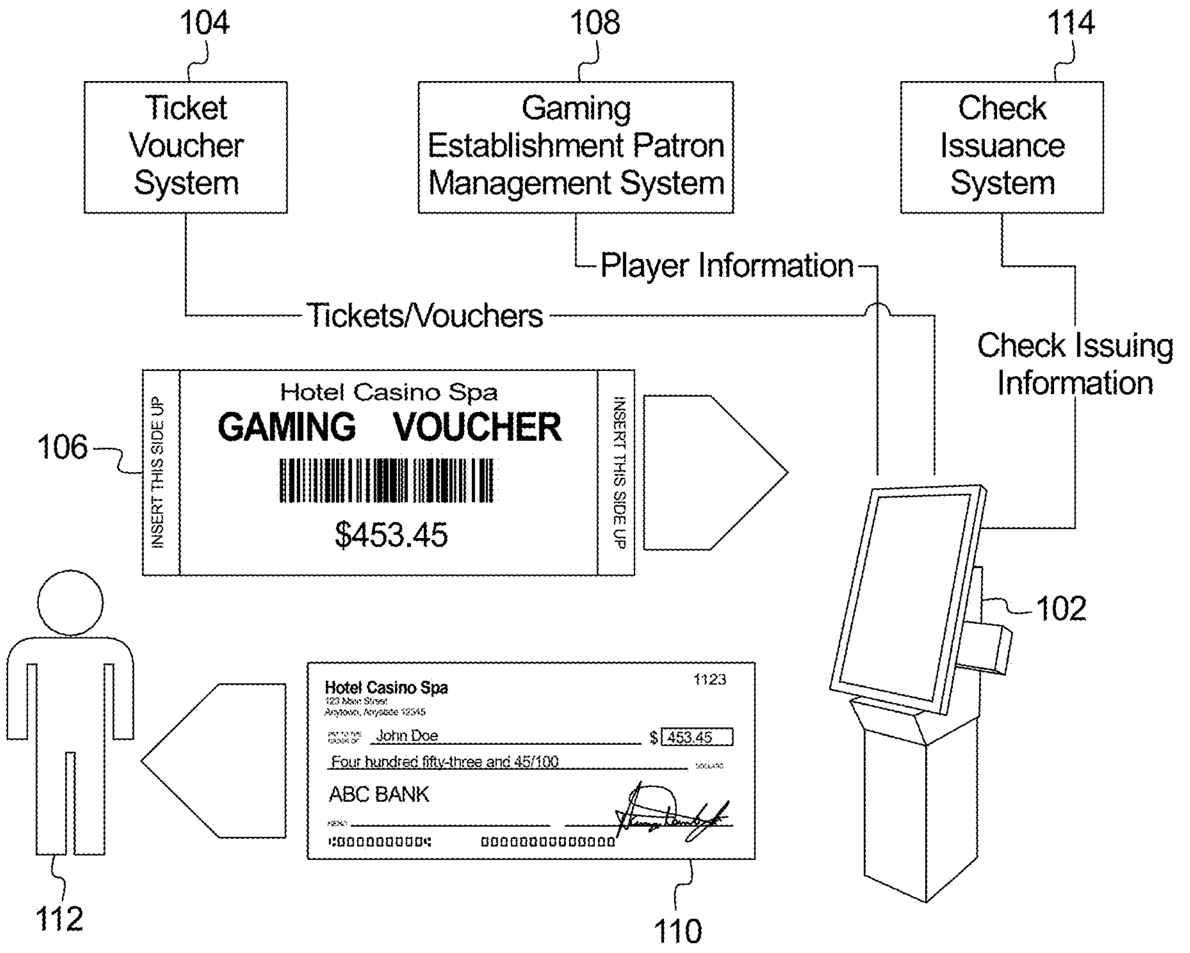
FIG. 1A is a schematic diagram of one embodiment illustrating the interactions between a ticket voucher system, a gaming establishment patron management system and a check issuing system in association with converting a ticket voucher to a check.

In various embodiments, the systems and methods of the present disclosure provide non-cash avenues to redeem a ticket voucher associated with an amount of funds and/or to access funds associated with a gaming establishment account maintained for a user. In certain such embodiments, systems and methods of the present disclosure enable a user to obtain a check in exchange for a redemption of a ticket voucher associated with an amount of funds and/or a withdrawal of an amount of funds associated with a gaming establishment account associated with the user.

In certain embodiments, following a user procuring a ticket voucher (e.g., an anonymous bearer instrument redeemable for cash via a kiosk and/or game play on a gaming establishment device such as an electronic gaming machine ("EGM")), the system enables the user to redeem the ticket voucher for a check issued in association with the gaming establishment. That is, rather than redeeming a ticket voucher at a kiosk or gaming establishment interface, such as a casino desk, for an amount of cash equal to an amount of funds associated with the redeemed ticket voucher, the system enables a user to redeem a ticket voucher, in paper form or virtual form, at a kiosk, a gaming establishment interface or a mobile device running an application associated with the gaming system, for, subject to any assessed fees, a check in the amount of funds associated with the redeemed ticket voucher.

In certain other embodiments, following a user's decision to cash-out an amount of funds associated with a gaming establishment account associated with the user, the system enables the user to cash out the amount of funds from the gaming establishment account for a check issued in association with the gaming establishment. In other words, rather than providing a user an amount of cash at a kiosk or gaming establishment interface, such as a casino desk, equal to an amount of funds from a gaming establishment account associated with the user, the system enables the user to utilize a kiosk, a gaming establishment interface or a mobile device running an application associated with the gaming system to withdraw the funds from the gaming establishment account, for, subject to any assessed fees, a check in the amount of the funds associated with the gaming establishment account.

In these embodiments, in view of the various security concerns (e.g., protecting gaming establishment cash and protecting gaming establishment patrons carrying cash) and labor concerns (e.g., servicing kiosks which dispense cash) associated with cash-based transactions, the system of the present disclosure provides alternative, non-cash-based options for a gaming establishment patron to redeem a ticket voucher or withdraw funds from a gaming establishment account associated with that patron while complying with various anti-money laundering regulations which require the tracking of certain financial transactions associated with a gaming establishment patron. As such, to further expand the cashless ecosystem certain gaming establishments strive for, the system of the present disclosure enables a user the opportunity to exchange a ticket voucher (in paper form or virtual form) or cash out an amount of funds of a gaming establishment account associated with the user, for an amount of funds that are independent of any amount of cash and relatively more secure than an amount of cash. Such configurations thus free the user up from having to carry such an amount of cash on their person (and thus diminishes the risks that such cash may be lost or stolen).

It should be appreciated that in addition to potentially providing a relatively more secure environment for a user (via reducing or eliminating the need for the user to carry cash), the system of the present disclosure further benefits the gaming establishment by freeing the gaming establishment up from also having to carry relatively large amounts of cash in cash dispensing kiosks. That is, by reducing the use of such kiosks, the system reduces the wear and tear on such devices thus prolonging the operational life on these devices. Moreover, by reducing the amount of cash transactions in a gaming establishment via utilizing the automated issuance of one or more checks, the system of the present disclosure reduces or eliminates human errors which often occur when ticket vouchers and/or gaming establishment account balances are redeemed at gaming establishment interfaces, such as casino desks. In other words, eliminating gaming establishment personnel from issuing amounts of cash in exchange for redeemed ticket vouchers and cashed out balances of gaming establishment accounts not only protects the user (if the gaming establishment personnel provides the user less cash than the user deserves) but also protects the gaming establishment (if the gaming establishment personnel inadvertently or fraudulently provides the user more cash than the user deserves).

Redeeming Ticket Vouchers

In various embodiments, following a user obtaining one or more ticket vouchers, such as upon a user of an EGM cashing out a credit balance in exchange for a ticket voucher associated with an amount of funds of the cashed out credit balance, the system enables a user to redeem such ticket vouchers in exchange for a check as a non-cash form of payment.

Figure 1B:
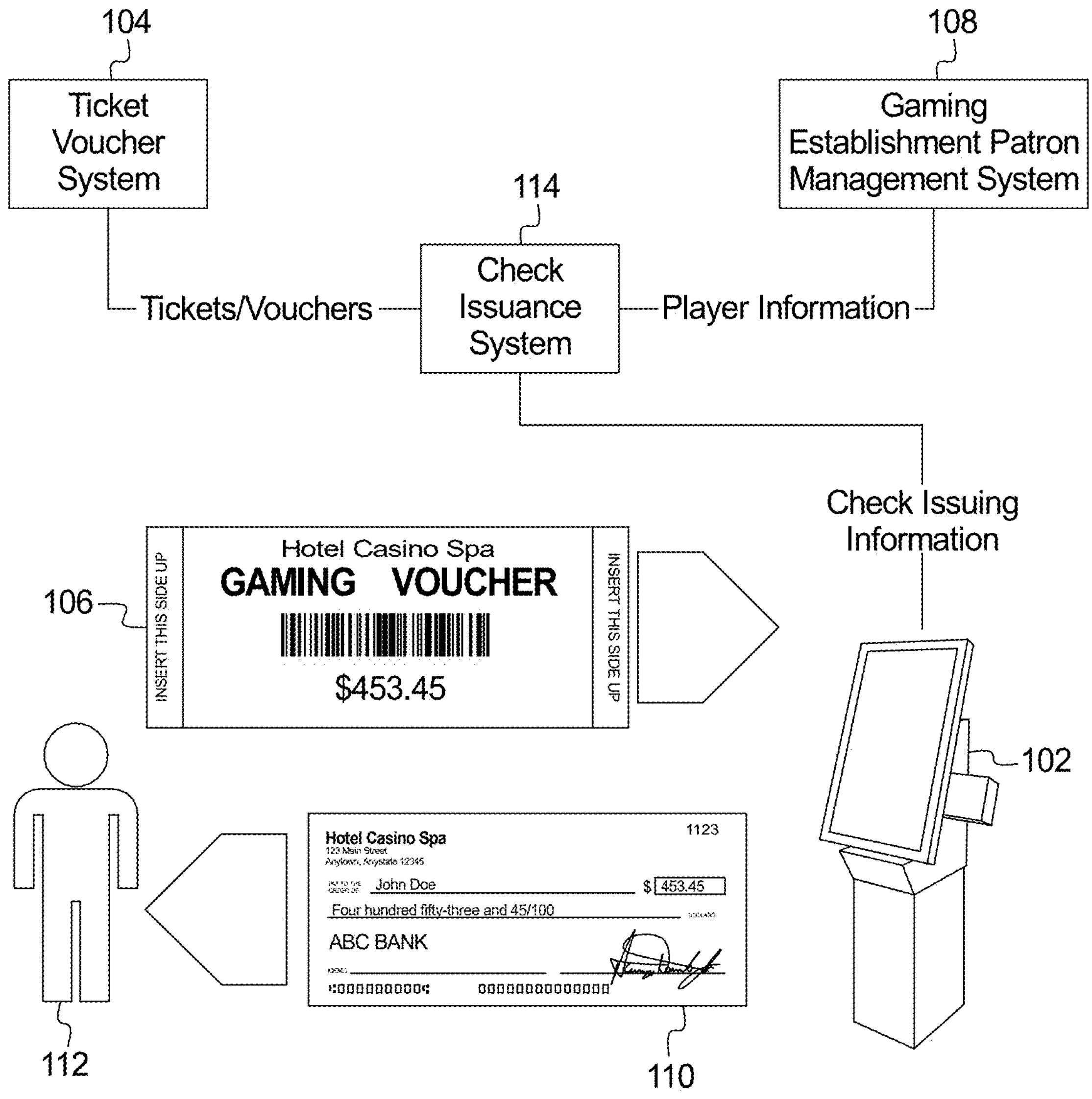
FIG. 1B is a schematic diagram of another embodiment illustrating the interactions between a ticket voucher system, a gaming establishment patron management system and a check issuing system in association with converting a ticket voucher to a check.

In one embodiment wherein the ticket voucher takes the form of a paper ticket voucher, the user provides the paper ticket voucher to a kiosk. In this embodiment, upon receiving the paper ticket voucher, the kiosk (or a component of a gaming establishment management system located inside the kiosk (i.e., a component of the kiosk)) scans the paper ticket voucher to obtain identifying information associated with the presented paper ticket voucher. The kiosk (or a component of a gaming establishment management system located inside the kiosk) then operates with the ticket voucher system to determine whether to authorize the redemption of the paper ticket voucher. For example, as seen in FIG. 1A, the kiosk 102 operates with the ticket voucher system 104 to determine whether a paper ticket voucher 106 is an authentic paper ticket voucher currently associated with the amount of funds indicated by the presented paper ticket voucher. In other words, the system verifies that the presented paper ticket voucher is a valid ticket voucher which is authentic and has not been previously redeemed and/or voided by the ticket voucher system. In another embodiment, the kiosk communicates information associated with the presented paper ticket voucher to a check issuance system which then operates with the ticket voucher system to determine whether to authorize the redemption of the paper ticket voucher. For example, as seen in FIG. 1B, the kiosk 102 operates with a check issuance system 114 which then operates with the ticket voucher system 104 to determine whether a paper ticket voucher 106 is an authentic paper ticket voucher currently associated with the amount of funds indicated by the presented paper ticket voucher.

In another embodiment wherein the ticket voucher takes the form of a paper ticket voucher, the user utilizes a mobile device application being run on a mobile device to scan the paper ticket voucher, wherein information regarding the scanned paper ticket voucher is communicated from the mobile device to a kiosk. In this embodiment, upon receiving the information regarding the scanned paper ticket voucher from the mobile device, the kiosk (or a component of a gaming establishment management system located inside the kiosk (i.e., a component of the kiosk)) operates with the ticket voucher system to determine whether to authorize the redemption of the paper ticket voucher by verifying that the paper ticket voucher is a valid ticket voucher which is authentic and has not been previously redeemed and/or voided by the ticket voucher system.

In one embodiment wherein the ticket voucher takes the form of a virtual ticket voucher, to redeem the virtual ticket voucher, the user presents a wallet identity (i.e., a physical card associated with a gaming establishment account associated with a virtual ticket voucher or a mobile device running a mobile device application associated with a gaming establishment account associated with a virtual ticket voucher or a mobile device running a mobile device application associated with a virtual ticket voucher independent of any gaming establishment account) to the kiosk. In this embodiment, upon launching the application on the mobile device and following the user selecting a virtual ticket voucher to redeem, the mobile device application prompts the user to cause the mobile device to engage the kiosk, such as prompting the user to tap the mobile device to a designated portion of the kiosk (or otherwise moving the mobile device to within a designated distance of a designated location of the kiosk) to initiate the redemption of the selected virtual ticket voucher. In this embodiment, the kiosk (or a component of a gaming establishment management system located inside the kiosk) operates with the ticket voucher system to determine whether to authorize the redemption of the virtual ticket voucher. That is, the ticket voucher redemption system operates with the ticket voucher system to determine whether the virtual ticket voucher is an authentic virtual ticket voucher by verifying that the virtual ticket voucher to be redeemed is a valid ticket voucher which is authentic and has not been previously redeemed and/or voided by the ticket voucher system.

In these embodiments, regardless of the form of the ticket voucher to be redeemed, if the system determines not to authorize the redemption of the ticket voucher because the ticket voucher is inauthentic or otherwise invalid, such as being previously redeemed or voided by the ticket voucher system, the system communicates a denial to the kiosk and does not complete the ticket voucher redemption. In certain embodiments, the system conveys one or more messages to the user regarding the denial of the ticket voucher redemption, such as via a display device of the kiosk and/or any mobile device used to attempt to redeem the ticket voucher.

Figure 2A:
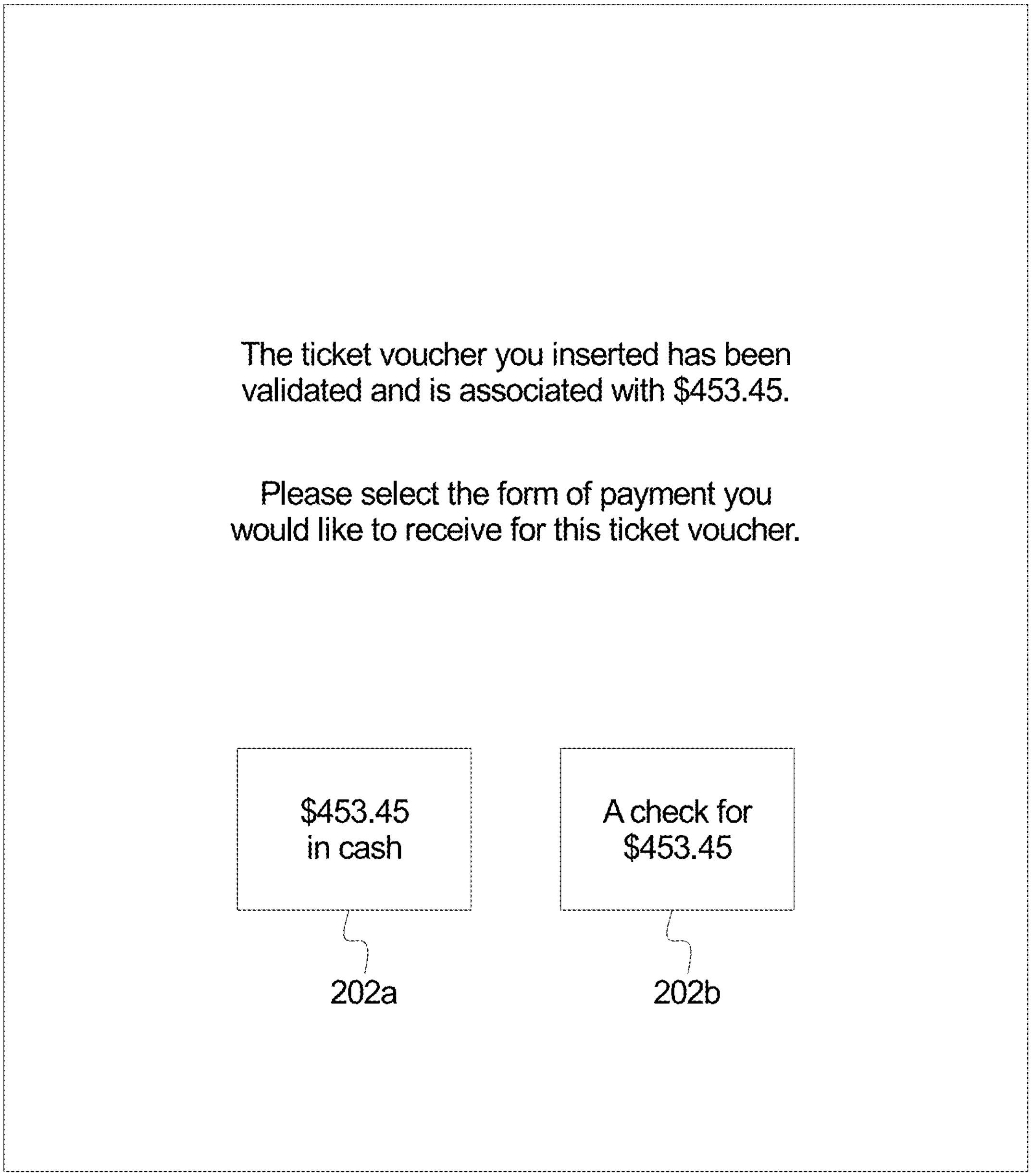
FIGS. 2A and 2B are example graphical user interfaces displayed by a kiosk in connection with redeeming a ticket voucher in association with an issuance of a check.

On the other hand, if the system determines to authorize the redemption of the ticket voucher because the ticket voucher is valid and authentic, the system notifies the kiosk of the approved redemption and informs the kiosk to enable the user to select a cash form of payment or a check form of payment for the amount of funds associated with the redeemed ticket voucher (minus any processing fees). For example, as seen in FIG. 2A, following the kiosk receiving a ticket voucher associated with a value of $453.45, the kiosk enables the user to select to receive $453.45 in cash 202*a* or $453.45 in the form of a check made out to the user 202*b*.

In certain embodiments, the non-cash form of payment includes a check made out to the user which is presentable at a financial institution for the amount of funds, subject to any applicable transaction or processing fees) associated with the redeemed ticket voucher. That is, instead of providing a user an amount of cash for a redeemed ticket voucher (which, as described above, is associated with various security concerns for the user and gaming establishment), the system of the present disclosure provides the user a check for a redeemed ticket voucher (which, as described herein, is associated with the creation of various electronic records to benefit both the user and the gaming establishment).

In certain embodiments, to comply with certain banking regulations, prior to enabling a user to convert an amount of funds associated with a redeemed ticket voucher to a check presentable at a financial institution, the kiosk must first obtain an identity of the user to whom to issue the check to. In certain embodiments, in association with redeeming a ticket voucher for a check, the kiosk communicates with one or more servers of a gaming establishment patron management system, such as a player tracking system (or one or more intermediate servers which then communicate with one or more servers of the gaming establishment patron management system) to attempt to identify the user redeeming the ticket voucher. For example, following a user presenting a user identity (e.g., a physical card associated with the user, or a mobile device running a mobile device application associated with one or more accounts maintained for the user, or a mobile device associated with an identity of the user or a mobile device associated with an identity of one or more accounts maintained for the user) to the kiosk, the kiosk 102 operates with a gaming establishment patron management system 108 to obtain information, if applicable, regarding an identity of the user redeeming the ticket voucher. In certain other embodiments wherein the user is redeeming a virtual ticket voucher for a check, in association with communicating data associated with the redeemed virtual ticket voucher to the kiosk, the mobile device application of the mobile device (which is accessing the virtual ticket voucher) also communicates identifying data associated with the user to the kiosk. In another embodiment wherein the user may be an anonymous user (e.g., the user does not have a registered user account or has not previously logged into the kiosk), the system requires the user to identify themselves to the kiosk, such as by manually entering at least their name via an interface (e.g., an on-screen keyboard) of the kiosk or by presenting one or more forms of identification to the kiosk (e.g., swiping or scanning a driver's license or passport).

If the user selects the cash form of payment for the amount of funds associated with the redeemed ticket voucher, then the kiosk issues an amount of cash to the user equal to the amount of funds associated with the redeemed ticket voucher. In association with the redemption of the ticket voucher for an amount of cash, the kiosk communicates data associated with such a redemption to the ticket voucher system which updates one or more databases to account for the redemption of the ticket voucher. That is, the kiosk sends data associated with the redeemed ticket voucher to a server of the ticket voucher system to record the transaction of the redemption of the ticket voucher.

On the other hand, if the user selects the check form of payment for the amount of funds associated with the redeemed ticket voucher, then the system communicates with one or more servers of an external network, such as a server of a check issuance system, to provide the check form of payment to the user. That is, rather than providing the user an amount of cash for a redeemed ticket voucher, the system enables the user to convert the amount of funds associated with a redeemed ticket voucher to a check which certain users and certain gaming establishments find preferable.

Figure 2B:
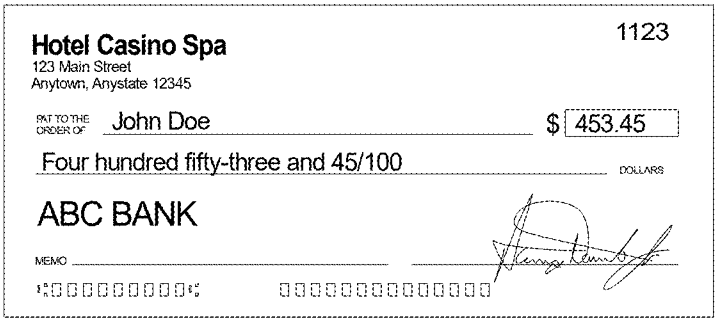

In certain embodiments upon the user selecting to redeem a ticket voucher for a check, the kiosk issues to the identified user a check having an amount of funds equal to, minus any processing fees, the amount of funds associated with the redeemed ticket voucher. For example, as seen in FIG. 2B, upon the user selecting to obtain $453.45 in the form of a check issued by the gaming establishment, the kiosk issues to the user a physical check in the amount of $453.45 (not shown) and informs the user to take the check dispensed by the kiosk.

In another embodiment, upon the user selecting to redeem a ticket voucher for a check, the kiosk issues to the user an electronic check having an amount of funds equal to, minus any processing fees, the amount of funds associated with the redeemed ticket voucher. In one such embodiment, in recognition of the lower administrative costs associated with electronic checks, the system imposes less processing fees for converting an amount of funds associated with a redeemed ticket voucher to an electronic check than a paper check.

In these embodiments, to issue a check (in physical or electronic form), the kiosk communicates with one or more servers of a check issuance system (or one or more intermediate servers which then communicate with one or more servers of the check issuance system) to cause a check to be issued for part or all of the amount of funds associated with the redeemed ticket voucher. In these embodiments, the kiosk is in communication with a check issuance system, such as a financial institution including one or more servers which store, in one or more databases, issued check identification information associated with each issued check, such as identifying information and value information. For example, as seen in FIG. 1A, in issuing a check 110 to a user 112 redeeming a ticket voucher 106, the kiosk 102 operates with a check issuance system 114 to issue the check associated with the redeemed ticket voucher. In other embodiments wherein the kiosk is in communication with a check issuance system which is in communication with the ticket voucher system and the gaming establishment patron management system, the check issuance system (and not the kiosk) operates with these gaming establishment systems to issue a check associated with a ticket voucher redeemed at a kiosk. For example, as seen in FIG. 1B, in issuing a check 110 to a user 112 redeeming a ticket voucher 106, the kiosk 102 communicates check issuing information to a check issuance system 114 which then operates with the ticket voucher system 104 and the gaming establishment patron management system 108 to issue the check associated with the redeemed ticket voucher.

In certain embodiments, to issue a check the system initiates a fund transfer wherein an amount of funds corresponding to part or all of the amount of the redeemed ticket voucher is transferred from a gaming establishment account which holds the funds associated with the ticket voucher system, such as a banking account associated with the gaming establishment, to a checking account of a financial institution which issues such checks, such as a checking account associated with a bank that issues the checks associated with redeemed ticket vouchers. In certain other embodiments, the gaming establishment account which holds the funds associated with the ticket voucher system, such as a banking account associated with the gaming establishment, also functions as a checking account associated with check writing features to issue the checks associated with redeemed ticket vouchers.

In various embodiments, in addition to communicating data with a server of a check issuance system to issue a check in association with the redemption of a ticket voucher, the kiosk communicates data associated with such a redemption to the ticket voucher system which records the transaction of the redemption of the ticket voucher (e.g., reduces the amount of funds associated with the identification number of the redeemed ticket voucher to account for the checks and any incurred fees) and updates one or more databases to account for the redemption of the ticket voucher.

It should be thus be appreciated that in addition to the ticket voucher system maintaining one or more records of the check issuance, the check issuance system, such as the financial institution associated with the gaming establishment from which such checks are withdrawn from, also maintains one or more records of the check issuance. For example, the ticket voucher system and/or the check issuance system maintain information regarding, but not limited to, a check number, a user's name, an amount of the amount check, an issue date of the check, and one or more transaction identifiers between the systems to enable for correlation between the check and the transaction that caused it. Such a dual system backup configuration may be useful to law enforcement and other entities interested in combating nefarious activities, such as money laundering.

Obtaining Ticket Vouchers

In various embodiments, prior to redeeming a ticket voucher for an amount of funds associated with one or more checks as described herein, an amount of funds must be converted to one or more ticket vouchers.

In certain embodiments, the system enables an amount of funds deposited in an EGM to be converted to one or more ticket vouchers. In one such embodiment, the system enables a user that has an amount of cash (or other forms of payment as disclosed herein) to utilize an EGM to convert the cash to one or more ticket vouchers via the user first depositing the amount of cash into the EGM and then subsequently cashing out (either pre or post any gaming activity) an amount of a credit balance of the EGM in exchange for a ticket voucher. In another such embodiment, the system enables a user that has one or more printed ticket vouchers to utilize an EGM to convert the printed ticket voucher(s) to a virtual ticket voucher associated with a gaming establishment account maintained for the user. In another such embodiment, the system enables a user that has one or more printed ticket vouchers to utilize an EGM to convert the printed ticket voucher(s) to an anonymous virtual ticket voucher associated with a mobile device.

In certain embodiments, the system enables an amount of funds deposited in a kiosk to be converted to one or more ticket vouchers. In one such embodiment, the system enables a user that has an amount of cash (or other forms of payment as disclosed herein) to utilize a kiosk to convert the cash to one or more ticket vouchers via the user depositing the amount of cash into the kiosk and then subsequently cashing out the deposited amount in exchange for a ticket voucher. In another such embodiment, the system enables a user that has one or more printed ticket vouchers to utilize a kiosk to convert the printed ticket voucher(s) to a virtual ticket voucher associated with a gaming establishment account maintained for the user. In another such embodiment, the system enables a user that has one or more printed ticket vouchers to utilize a kiosk to convert the printed ticket voucher(s) to an anonymous virtual ticket voucher associated with a mobile device.

In certain embodiments, the system enables an amount of funds provided to a gaming establishment interface, such as a casino desk or cage, to be converted to one or more ticket vouchers. In one such embodiment, the system enables a user that has an amount of cash (or other forms of payment as disclosed herein) to utilize a gaming establishment interface to convert the cash to one or more ticket vouchers via the user providing the amount of cash to the gaming establishment interface in exchange for a ticket voucher. In another such embodiment, the system enables a user that has one or more printed ticket vouchers to utilize a gaming establishment interface to convert the printed ticket voucher (s) to a virtual ticket voucher associated with a gaming establishment account maintained for the user. In another such embodiment, the system enables a user that has one or more printed ticket vouchers to utilize a gaming establishment interface to convert the printed ticket voucher(s) to an anonymous virtual ticket voucher associated with a mobile device.

In certain embodiments, the system enables an amount of funds provided to a retail interface, such as a kiosk or cashier at a retail establishment, to be converted to one or more ticket vouchers. In one such embodiment, the system enables a user that has an amount of cash (or other forms of payment as disclosed herein) to utilize a retail interface to convert the cash to one or more ticket vouchers via the user providing the amount of cash to the retail interface in exchange for a ticket voucher.

In certain embodiments, the system enables an amount of funds associated with a gaming establishment account maintained for the user, such as a gaming establishment retail account or a cashless wagering account, to purchase a ticket voucher. In these embodiments, the system enables a user to transfer an amount of funds from a gaming establishment account maintained for the user to a ticket voucher system in exchange for a ticket voucher.

It should be appreciated that in these embodiments wherein funds from one or more sources are potentially used to obtain a ticket voucher, when a user attempts to obtain one or more ticket vouchers, the system determines whether to authorize the exchange of an amount of funds for a ticket voucher. If the system determines not to authorize the exchange of an amount of funds for a ticket voucher, the system communicates a denial to the user and does not cause any ticket vouchers to be issued. On the other hand, if the system determines to authorize the exchange of an amount of funds for a ticket voucher, the system: (i) retains the amount of funds (if, for example, an amount of cash is exchanged at a kiosk for a ticket voucher); (ii) updates a credit balance to reflect the exchange of an amount of funds for a ticket voucher (if, for example, a credit balance of an EGM is being cashed out in exchange for a ticket voucher); and/or (iii) updates an account to reflect the exchange of an amount of funds for a ticket voucher (if, for example, a gaming establishment account associated with the user is exchanged for a ticket voucher). In these embodiments, following the exchange of an amount of funds for a ticket voucher, the system communicates an authorization to the ticket voucher system. Upon receiving data associated with the authorized exchange of an amount of funds for a ticket voucher, the ticket voucher system creates a ticket voucher associated with the exchanged amount of funds and stores data associated with the ticket voucher in one or more databases. Such a created ticket voucher is associated with ticket voucher identification information maintained by the ticket voucher system to identify that ticket voucher for subsequent validation upon a redemption of that ticket voucher. In these embodiments, for each created ticket voucher, the ticket voucher identification information maintained by the ticket voucher system includes one or more of: a date of the ticket voucher issuance, a validation or identification number, such as a ticket number, associated with the ticket voucher, a property address associated with the ticket voucher issuance, an amount of funds associated with the ticket voucher, an expiration date associated with the ticket voucher, an EGM identification associated with the issuance of the ticket voucher, a kiosk identification association with the issuance of the ticket voucher, font or formatting information associated with the ticket voucher, and/or an image of the ticket voucher (e.g., an image of a front of the ticket voucher and/or an image of a back of the ticket voucher).

It should be appreciated that since a created ticket voucher may take multiple forms, the system of the present disclosure includes multiple ways to convey such a created ticket voucher to the user. In one embodiment wherein the created ticket voucher takes the form of a paper ticket voucher, the ticket voucher system causes a ticket voucher printer to print the created ticket voucher. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

System Accounts

In various embodiments, in addition to or alternative from enabling a user to redeem one or more ticket vouchers for one or more checks, the system of the present disclosure enables a user to cash-out an amount of funds associated with a gaming establishment account associated with the user (and maintained by a gaming establishment fund management system) in exchange for a check issued in association with the gaming establishment. In other words, rather than providing a user an amount of cash at a kiosk or gaming establishment interface, such as a casino desk, equal to an amount of funds from a gaming establishment account associated with the user, the system enables the user to utilize a kiosk, a gaming establishment interface or a mobile device running an application associated with the gaming system to withdraw the funds from the gaming establishment account, for, subject to any assessed fees, a check in the amount of the funds associated with the gaming establishment account.

In certain embodiments, a gaming establishment fund management system includes various components or subsystems that are each associated with or otherwise maintain one or more electronic or virtual accounts. In these embodiments, the various gaming establishment accounts maintained for a user collectively form a resort or enterprise account (e.g., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a player and/or retail patron, collectively form a resort or enterprise account (i.e., an integrated resort or gaming establishment fund management wallet) that the user may access to transfer funds and/or view balance information amongst the various accounts associated with or otherwise maintained for the user.

Figure 3:
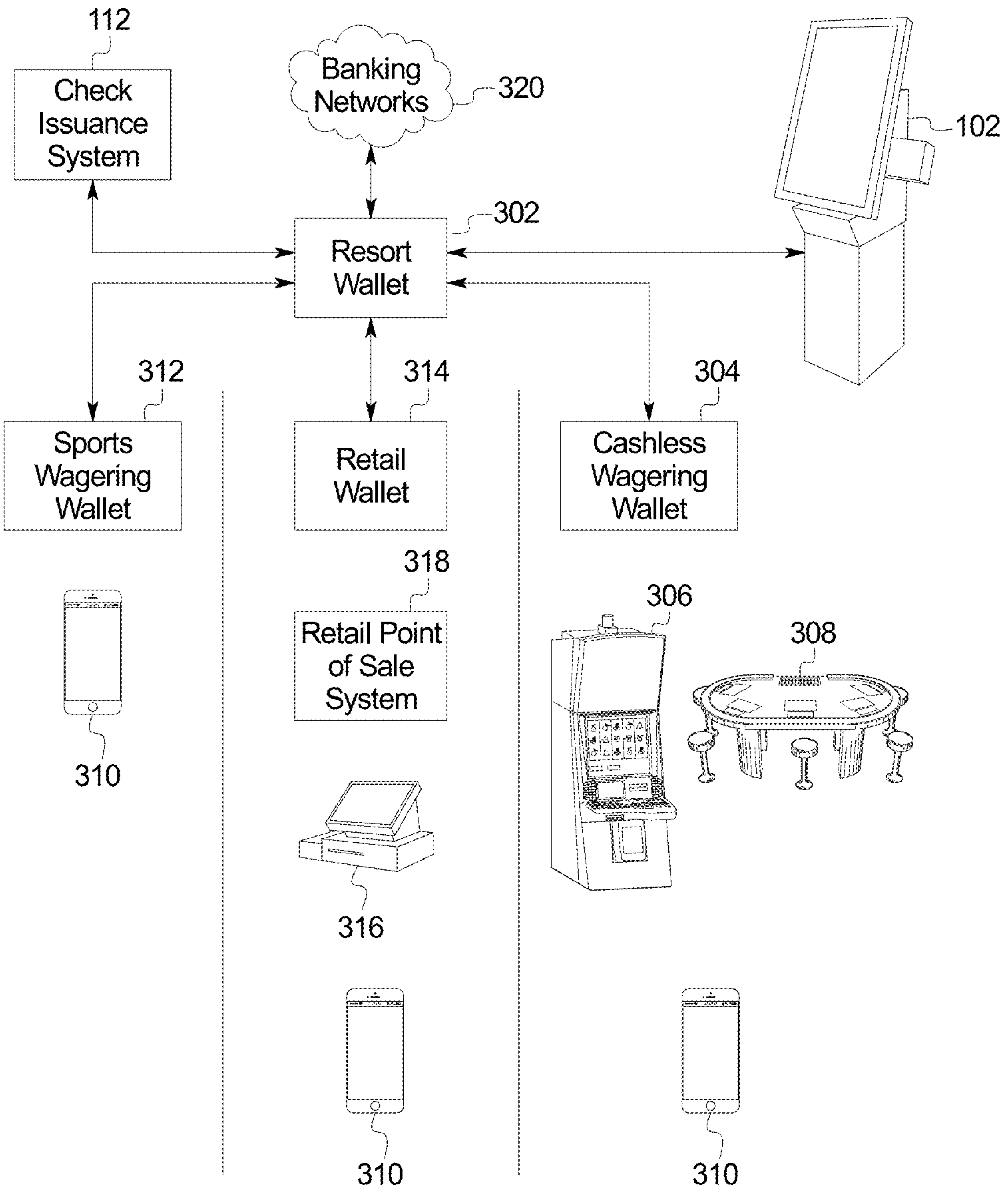
FIG. 3 is an example schematic configuration of the architecture of a plurality of different components of a gaming establishment fund management system of the present disclosure.

In various embodiments, the gaming establishment fund management system includes one or more cashless wagering systems that are each associated with or otherwise maintain one or more cashless wagering accounts. In certain embodiments, the gaming establishment fund management system includes a first cashless wagering system that maintains a first cashless wagering account. In these embodiments, a user, such as a player of a gaming establishment wagering device, utilizes a mobile device application running on a mobile device and/or a physical instrument (e.g., a smart card or a player issued magnetic striped card which the player utilizes via inserting the card into a player tracking unit associated with a gaming establishment wagering device) to facilitate the electronic transfer of any funds between this first cashless wagering account and a gaming establishment wagering device that offers wagering games, such as an EGM including, but not limited to, a slot machine, a video poker machine, a video lottery terminal, a terminal associated with an electronic table game, a terminal associated with a live table game, a video keno machine, a video bingo machine located on a casino floor and/or a sports betting terminal (that offers wagering games and sports betting opportunities). For example, as seen in FIG. 3, the gaming establishment fund management system includes a first cashless wagering system (not shown) that maintains a Cashless Wagering Wallet 304 (e.g., a first cashless wagering account) which is in communication with the resort wallet 302. In this example, to facilitate the transfer of funds from this cashless wagering account to a credit balance of an EGM 306 and/or a gaming table 308, the system utilizes a mobile device 310 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a player issued magnetic striped card which the player utilizes via inserting the card into a kiosk) to facilitate the electronic transfer of any funds between this second cashless wagering account and a credit balance accessible to wager on games of chance, games of skill and/or sporting events remote from an EGM and a gaming table. For example, as seen in FIG. 3, the gaming establishment fund management system includes a second cashless wagering system (not shown) that maintains a Sports/Mobile Wagering Wallet 312 (e.g., a second cashless wagering account) which is in communication with the resort wallet 302. In this example, to facilitate the transfer of funds from this cashless wagering account to a credit balance associated with a sporting event wagering system (not shown) and/or a remote wagering system (not shown) to enable the placement of one or more wagers on one or more games of chance, one or more games of skill and/or one or more sporting events, the system utilizes a mobile device 310 running a mobile device application that interfaces with one or more components of the gaming establishment fund management system to enable a user, such as a player remote from the gaming establishment, access to this second cashless wagering account.

In various embodiments, in addition to or an alternative of maintaining one or more cashless wagering accounts via one or more cashless wagering systems, the gaming establishment fund management system includes one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 3, the gaming establishment fund management system includes a gaming establishment retail wallet system (not shown) that maintains a Retail Wallet 314 (e.g., a gaming establishment retail account) which is in communication with the resort wallet 302. In this example, to facilitate the transfer of funds from this gaming establishment retail account to an account associated with a retailer to purchase goods and/or services from the retailer, the system utilizes retail wallet identity, such as a mobile device 310 running a mobile device application that interfaces with a point-of-sale terminal 316 of a retail point-of-sale system 318 of the retailer, and one or more components of the gaming establishment fund management system to enable a user access to this gaming establishment retail account.

It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. That is, while an amount of funds deposited in a gaming establishment retail account may be used with various retail point-of-sale systems throughout the gaming establishment (or remote from, but otherwise associated with the gaming establishment) to enable users to purchase goods and/or services, such funds deposited in the gaming establishment retail account cannot be converted to cash or check.

In certain embodiments, the gaming establishment fund management system is in communication with one or more external funding sources which maintain one or more external accounts for the user. For example, as seen in FIG. 3, the gaming establishment fund management system that maintains the resort wallet 302 is in communication with a network of one or more banks or other financial institutions (i.e., the banking networks 320) which operate to electronically transfer funds from the user's accounts maintained as such banks or financial institutions to one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system described herein can be in communication with one or more external funding sources. In different embodiments, the system utilizes a mobile device running a mobile device application, a kiosk, an EGM, a remote host controller service window displayed by an EGM, a component of a gaming establishment patron management system, such as a player tracking unit, and/or a gaming establishment interface to facilitate the transfer of funds from a third-party account.

In certain embodiments, the gaming establishment fund management system is in communication with one or more check issuance systems and one or more kiosks that issue checks as described herein. For example, as seen in FIG. 3, the gaming establishment fund management system that maintains the resort wallet 302 is in communication with a check issuance system 112 and a kiosk 102 which operate to issue one or more checks. It should be appreciated that the check issuance system 112 may be part of or independent of the banking networks 320 which the gaming establishment fund management system that maintains the resort wallet 302 is also in communication with. It should be further appreciated that while illustrated as the gaming establishment fund management system being in communication with one or more check issuance systems and kiosks, in different embodiments, any component or sub-system described herein can be in communication with one or more check issuance systems and/or kiosks. In different embodiments, the system utilizes a mobile device running a mobile device application, an EGM, a remote host controller service window displayed by an EGM, a component of a gaming establishment patron management system, such as a player tracking unit, and/or a gaming establishment interface to facilitate the issuance of one or more checks.

In certain embodiments (not shown), the gaming establishment fund management system (which maintains a gaming establishment fund management account or resort wallet for a user) is in communication with one or more credit systems that each issue the user one or more lines of credit or markers and/or one or more credit reporting/credit risk systems that monitor and report on various accounts associated with the user. It should be appreciated that while described as the gaming establishment fund management system being in communication with one or more credit systems and/or one or more credit reporting/credit risk systems, in different embodiments, any component or subsystem described herein can be in communication with one or more credit systems and/or one or more credit reporting/credit risk systems.

In certain embodiments, the system utilizes one mobile device application to interact with the different components of the gaming establishment fund management system to access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to access funds maintained in the different gaming establishment accounts associated with the user. For example, in addition to utilizing a mobile application to interact with different systems of the gaming establishment fund management system, utilizing a sports/mobile wagering mobile application, a mobile device interacts with the second cashless wagering system of the gaming establishment fund management system. In certain of these embodiments, the mobile device applications include a location based digital wallet enabled application, such as a Passbook-enabled or Wallet-enabled application, which is accessible when the player enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that while illustrated in FIG. 3 as using a mobile device running a mobile device application to access funds associated with different gaming establishment accounts, such as a cashless wagering account and a gaming establishment retail account, a physical instrument, such as a smart card or a user issued magnetic striped card may additionally or alternatively be utilized to enable a user access to such gaming establishment accounts. It should be further appreciated that in different embodiments, in addition to or alternatively from utilizing a mobile device running a mobile device application to access funds associated with different gaming establishment accounts, the system utilizes a kiosk, an EGM, a remote host controller service window displayed by an EGM, a component of a gaming establishment patron management system, such as a player tracking unit, and/or a gaming establishment interface, such as a casino desk, to access the funds associated with such gaming establishment accounts.

In various embodiments, following a user obtaining funds in one or more gaming establishment accounts, the system enables a user to cash out such funds in exchange for a check as a non-cash form of payment. In one such embodiment, following a user making one or more inputs via a mobile device application executed by a mobile device to cash out funds maintained for the user in a gaming establishment account, a kiosk (or a component of a gaming establishment fund management system located inside the kiosk) operates with the gaming establishment fund management system to determine whether to authorize the requested cash out. That is, the kiosk operates with the gaming establishment fund management system to determine whether to authorize the requested fund transfer. In other words, the system verifies that the gaming establishment account associated with the user from which an amount of funds are requested from is associated with the requested amount of funds.

In these embodiments, if the system determines not to authorize the cashing out of the requested amount of funds from the gaming establishment account associated with the user, the system communicates a denial to the kiosk and does not complete the cashout. In certain embodiments, the system conveys one or more messages to the user regarding the denial of the cashout, such as via a display device of the kiosk and/or via a display of a mobile device utilized in the attempted cashout transaction.

On the other hand, if the system determines to authorize the cashing out of the requested amount of funds from the gaming establishment account associated with the user, the system notifies the kiosk of the approval and informs the kiosk to enable the user to select a cash form of payment or a check form of payment for the amount of funds (minus any processing fees).

In certain embodiments, the non-cash form of payment includes a check made out to the user (whom may be identifiable in association with the account which the funds are withdrawn from) which is presentable at a financial institution for the amount of funds, subject to any applicable transaction or processing fees) withdrawn from the gaming establishment account associated with the user. That is, instead of providing a user an amount of cash for withdrawing funds from the gaming establishment account associated with the user (which is associated with various security concerns for the user and gaming establishment), the system of the present disclosure provides the user a check for a withdrawal from the gaming establishment account associated with the user (which is associated with the creation of various electronic records to benefit both the user and the gaming establishment).

If the user selects the cash form of payment for the amount of funds maintained in the gaming establishment account associated with the user, then the kiosk issues an amount of cash to the user equal to the amount of funds requested to be withdrawn from the gaming establishment account associated with the user. In association with the cashing out of the amount of funds requested to be withdrawn from the gaming establishment account associated with the user, the kiosk communicates data associated with such a transaction to the gaming establishment fund management system which updates one or more databases to account for the transaction. That is, the kiosk sends data associated with the cashout transaction to a server of the gaming establishment fund management system to record the transaction against the gaming establishment account associated with the user.

On the other hand, if the user selects the check form of payment for the amount of funds requested to be withdrawn from the gaming establishment account associated with the user, then the system communicates with one or more servers of an external network, such as a server of a check issuance system, to provide the check form of payment to the user. That is, rather than providing the user an amount of cash for cashing out a gaming establishment account associated with the user, the system enables the user to convert the amount of funds withdrawn from the gaming establishment account associated with the user to a check which certain users and certain gaming establishments find preferable.

In certain embodiments upon the user selecting to withdraw an amount of funds from a gaming establishment account associated with the user for a check, the kiosk issues to the identified user a check having an amount of funds equal to, minus any processing fees, the amount of funds requested to be withdrawn from the gaming establishment account associated with the user. In another embodiment, upon the user selecting to withdraw an amount of funds from a gaming establishment account associated with the user for a check, the kiosk issues to the user an electronic check having an amount of funds equal to, minus any processing fees, the amount of funds requested to be withdrawn from the gaming establishment account associated with the user. In one such embodiment, in recognition of the lower administrative costs associated with electronic checks, the system imposes less processing fees for withdrawing an amount of funds from a gaming establishment account associated with the user to an electronic check than a paper check.

In these embodiments, to issue a check (in physical or electronic form), the kiosk communicates with one or more servers of a check issuance system (or one or more intermediate servers which then communicate with one or more servers of the check issuance system) to cause a check to be issued for part or all of the amount of funds requested to be withdrawn from the gaming establishment account associated with the user. In these embodiments, the kiosk is in communication with a check issuance system, such as a financial institution including one or more servers which store, in one or more databases, issued check identification information associated with each issued check, such as identifying information and value information.

In certain embodiments, to issue a check, the system initiates a fund transfer wherein an amount of funds corresponding to the amount withdrawn from the gaming establishment account associated with the user is transferred from an account which holds the funds, such as a banking account associated with the gaming establishment, to a checking account of a financial institution which issues such checks, such as a checking account associated with a bank that issues the checks associated with cashing out amounts from gaming establishment accounts associated with users. In certain other embodiments, the gaming establishment account which holds the funds also functions as a checking account associated with check writing features to issue the checks associated with cashing out amount from gaming establishment accounts associated with users.

In these embodiments, in addition to communicating data with a server of a check issuance system to issue a check in association with the withdrawal of an amount of funds from the gaming establishment account associated with the user, the kiosk communicates data associated with such a transaction to a gaming establishment fund management system which records the transaction (e.g., reduces the amount of funds associated with the gaming establishment account associated with the user to account for the checks and any incurred fees) and updates one or more databases to account for the transaction.

It should be thus be appreciated that in addition to the gaming establishment fund management system maintaining one or more records of the check issuance, the check issuance system, such as the financial institution associated with the gaming establishment from which such checks are withdrawn from, also maintains one or more records of the check issuance. For example, the gaming establishment fund management system and/or the check issuance system maintain information regarding, but not limited to, a check number, a user's name, an amount of the amount check, an issue date of the check, and one or more transaction identifiers between the systems to enable for correlation between the check and the transaction that caused it. Such a dual system backup configuration may be useful to law enforcement and other entities interested in combating nefarious activities, such as money laundering.

In various embodiments wherein an amount of a redeemed ticket voucher and/or an amount withdrawn from the gaming establishment account associated with a user are provided to the user via one or more issued checks, the issued physical check is printed using one or more of non-magnetic ink or toner or magnetic ink or toner (which certain financial institutions, such as banks, use with magnetic ink character recognition scanners to process). In different embodiments, the issued physical check is printed on non-custom paper or custom paper used for check printing, such as paper with a perforated line (e.g., check-o-matic paper) that enables additional information about the transaction to be printed for the user, such as the issuing gaming establishment, the device used to issue the check, a transaction identifier, the amount requested, a time of issuance, any fees charged to the user for issuing a check, the form of any fees paid (e.g., any promotional credits, player tracking points or comp balance) for issuing the check.

In various embodiments wherein an amount of a redeemed ticket voucher and/or an amount withdrawn from the gaming establishment account associated with a user are provided to the user via one or more issued checks, the kiosk enables a user to select a check form of payment for the entire amount of funds associated with the transaction. In certain embodiments, the kiosk enables a user to select a check form of payment for a portion of the amount of funds associated with the transaction. In these embodiments, the kiosk enables a user to split the amount of funds associated with the transaction into one or more forms of payment, such as between a check, an amount of cash and/or a transfer of an amount of funds to a financial account associated with the user that is maintained by a financial institution. For example, if a user has a ticket voucher associated with $1000 and the user redeems that ticket voucher at a kiosk, the kiosk enables the user to select to split the amount of funds to $100 in cash (dispensed by the kiosk) and a check for $900.

In various embodiments wherein an amount of a redeemed ticket voucher and/or an amount withdrawn from the gaming establishment account associated with a user are provided to the user via one or more issued checks, to facilitate the conversion of such funds to a check, as indicated above, the system imposes certain fees associated with such a conversion. Certain of these transaction fees are imposed by the financial institution which is issuing the check. In another such embodiment, different financial institutions may additionally or alternatively impose different fees for different amounts of funds being paid out as checks (e.g., a transaction that results in a check having a value of under $500 carries a 2% fee imposed on the amount of funds while a transaction that results in a check having a value of $500 and greater carries a 1% fee imposed on the amount of the funds).

In certain embodiments, the amount of such fees are taken from the amount of funds associated with the transaction. In certain embodiments, the user separately pays such fees using playing tracking points, comps, currency, funds associated with one or more gaming establishment accounts maintained for the user, and/or promotional points. In certain embodiments, to encourage the use of this alternative form of obtaining funds (and thus realize the various above-described benefits to the user and gaming establishment), the gaming establishment pays for such fees on the user's behalf. In these embodiments, the gaming establishment may pay the fees for certain users (e.g., identified users having a relatively high player tracking status) while not pay the fees for other users (e.g., unidentified users). In certain other embodiments, to facilitate the conversion of such funds to a check, the system does not impose any fees associated with such a conversion. In certain other embodiments, to encourage the use of this alternative form of obtaining funds (and thus realize the various above-described benefits to the user and gaming establishment), the gaming establishment enables a user to convert a first amount of funds associated with a transaction to a check associated with a second, greater amount of funds. In certain other embodiments, to encourage the use of this alternative form of obtaining funds (and thus realize the various above-described benefits to the user and gaming establishment), the gaming establishment offers various benefits to the user, such a quantity of player tracking points, a quantity of promotional credits, and/or one or more plays of one or more games to win one or more awards if the user converts the amount of funds associated with the transaction to a check.

In various embodiments wherein an amount of a redeemed ticket voucher and/or an amount withdrawn from the gaming establishment account associated with a user are provided to the user via one or more issued checks, in view of various anti-money laundering regulations, the kiosk imposes certain limits on the amount of funds which can be converted to checks over a designated period of time, such as over a day, a week or a month. In these embodiments, for each identified user, the system maintains a database of transactions for checks such that the system may determine, based on any limits imposed for that user, whether or not to authorize the issuance of a check. For example, prior to authorizing the redemption of a ticket voucher to a check for an identified user, the system determines if that user is below the limit imposed by the system on that user for the designated period of time. In this example, if the system determines that the user has exceeded the limit imposed by the system on that user for the designated period of time, the system prohibits the further conversion of funds associated with ticket vouchers to checks for the designated period of time. On the other hand, in this example if the system determines that the user is below the limit imposed by the system on that user for the designated period of time, the system enables the system to proceed as described herein with the conversion of funds associated with ticket vouchers to a check. It should be appreciated that such a database of which users participated in transactions that resulted in the issuance of one or more checks enables authorities in any future financial fraud investigations or anti-money laundering compliance related tasks. It should be further appreciated that such limits may be soft limits that may be overridden by gaming establishment personnel.

In certain embodiments, the system imposes different limits for different users based on the identity of those users. For example, the system enables different identified users to redeem one or more ticket vouchers associated with different amounts of funds for one or more checks over a designated period of time, wherein the system enables an identified user having a first player tracking status to redeem one or more ticket vouchers having a total value of $1000 or less per day for one or more checks while the system enables an identified user having a second, greater player tracking status to redeem one or more ticket vouchers having a total value of up to $5000 per day for one or more checks.

It should be appreciated that following the issuance of the check, the physical check may be physically or electronically presented to a financial institution for payment. In one such embodiment, an electronic presentation of the physical check includes the utilization of a mobile device application associated with the user's financial institution to capture, using a camera of the mobile device, one or more images of the physical check (such as, but not limited to, at least an image of the front of the physical check and an image of the back of the physical check such that certain necessary information, such as the bank routing number, the checking account number and the endorsement by the user, are appropriately captured). In these embodiments, following the physical or electronic presentation of the physical check or the electronic presentation of the electronic check, after the financial institution has validated the check, the financial institution makes the amount of funds associated with the check available to the user.

It should be appreciated that while described herein as the user utilizing a kiosk to convert an amount of funds associated with a redeemed ticket voucher and/or an amount of funds of a gaming establishment account associated with a user to one or more checks, in alternative embodiments, an EGM, a mobile device, and/or a gaming establishment interface, such as a casino desk, are each operable to convert such amounts of funds to one or more checks. For example, when a gaming establishment interface, such as a casino desk, redeems ticket vouchers for checks, gaming establishment personnel interface with the ticket voucher system, the gaming establishment patron management system, the gaming establishment fund management system and/or the check issuance system as described herein to cause one or more checks to be issued.

It should be further appreciated that in different embodiments, certain alternative devices are operable to convert an amount of funds associated with a redeemed ticket voucher and/or an amount of funds of a gaming establishment account associated with a user to certain types of checks while other alternative devices are operable to convert an amount of funds associated with a redeemed ticket voucher and/or an amount of funds of a gaming establishment account associated with a user to any type of check. For example, while an EGM which is configured to print a check may convert an amount of funds associated with a redeemed ticket voucher to either a physical check or an electronic check, a mobile device running a mobile device application may convert an amount of funds associated with a redeemed ticket voucher to an electronic check.

Accordingly, in view of the various security concerns (e.g., protecting gaming establishment cash and protecting gaming establishment patrons carrying cash) and labor concerns (e.g., servicing kiosks which dispense cash in exchange for ticket vouchers) associated with cash-based transactions, the system of the present disclosure provides an alternative, non-cash-based option for a gaming establishment patron to obtain funds associated with a redeemed ticket voucher and/or a withdrawal of an amount of funds from a gaming establishment account associated with the gaming establishment patron while complying with various anti-money laundering regulations which require the tracking of certain financial transactions associated with a gaming establishment patron. As such, to further expand the cashless ecosystem certain gaming establishments strive for, the system of the present disclosure enables a user the opportunity to exchange a ticket voucher, in paper form or virtual form, and/or withdraw funds from a gaming establishment account associated with the gaming establishment patron as part of a transaction that is independent of any amount of cash and relatively more secure than an amount of cash.

Kiosk Components

In various embodiments, the conversion of one or more ticket vouchers to one or more checks and/or the conversion of an amount of funds of a gaming establishment account associated with a user to one or more checks utilizes one or more components of a ticket voucher system and/or a gaming establishment fund management system. Such components of the ticket voucher system and/or the gaming establishment fund management system include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the ticket voucher system and/or the gaming establishment fund management system; (3) accessing memory to configure or reconfigure parameters in the memory according to indicia read from the component of the ticket voucher system and/or the gaming establishment fund management system; (4) communicating with interfaces and the peripheral devices (such as input/output devices); and/or (5) controlling the peripheral devices. In certain embodiments, one or more components of the controller (such as the at least one processor) reside within a housing of the component of the ticket voucher system and/or the gaming establishment fund management system, while in other embodiments, at least one component of the controller resides outside of the housing of the component of the ticket voucher system and/or the gaming establishment fund management system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the ticket voucher system and/or the gaming establishment fund management system of the present disclosure. In certain embodiments, the at least one memory device resides within the housing of the component of the ticket voucher system and/or the gaming establishment fund management system, while in other embodiments at least one component of the at least one memory device resides outside of the housing of the component of the ticket voucher system and/or the gaming establishment fund management system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the ticket voucher system and/or the gaming establishment fund management system; (2) associations between configuration indicia read from a component of the ticket voucher system and/or the gaming establishment fund management system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the ticket voucher system and/or the gaming establishment fund management system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the ticket voucher system and/or the gaming establishment fund management system to control the component of the ticket voucher system and/or the gaming establishment fund management system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the ticket voucher system and/or the gaming establishment fund management system to implement at least part of the present disclosure. In other embodiments, part or all of the program code and/or the operating data is downloaded to the at least one memory device of the component of the ticket voucher system and/or the gaming establishment fund management system through any suitable data network described above (such as an Internet or intranet).

The at least one memory device also stores a plurality of device drivers. Examples of different types of device drivers include device drivers for component of the ticket voucher system and/or the gaming establishment fund management system components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the ticket voucher system and/or the gaming establishment fund management system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the ticket voucher system and/or the gaming establishment fund management system loads the new device driver from the at least one memory device to enable communication with the new device. For instance, one type of card reader in the component of the ticket voucher system and/or the gaming establishment fund management system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified component of the ticket voucher system components and/or the gaming establishment fund management system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device and at least one check dispenser; (2) at least one input device (which may include contact and/or non-contact interfaces) including at least one debit card/credit card reader; (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

Mobile Device Communications

As indicated above, in various embodiments, one or more actions occur between a mobile device and one or more components of the ticket voucher system and/or the gaming establishment fund management system, such as a kiosk, via one or more wireless communication protocols between the mobile device and the component of the ticket voucher system and/or the component of the gaming establishment fund management system. For example, the mobile device application of the mobile device communicates virtual ticket voucher identifying information to a kiosk over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and/or one or more short range communication protocols (e.g., a near field communication ("NFC") protocol).

In certain embodiments, the communication with the mobile device can occur through one or more wireless interfaces of the component of the ticket voucher system and/or the component of the gaming establishment fund management system. In one embodiment, the wireless interface is integrated into the cabinet of the component of the ticket voucher system and/or the component of the gaming establishment fund management system and the processor of the component of the ticket voucher system and/or the component of the gaming establishment fund management system is configured to communicate directly with and send control commands to the wireless interface. In another embodiment, the wireless interface is integrated into a device mounted to and/or within the cabinet of the component of the ticket voucher system and/or the component of the gaming establishment fund management system. In certain embodiments where the wireless interface is embedded in a secondary device, the processor of the component of the ticket voucher system and/or the component of the gaming establishment fund management system sends control commands to control the wireless interface via a secondary controller.

In certain embodiments which utilize an NFC implementation, the mobile device application registers a mobile device application with one or more processors of the mobile device. In these embodiments, when the mobile device is detected by an NFC reader of a component of the ticket voucher system and/or the gaming establishment fund management system, the component of the ticket voucher system and/or the component of the gaming establishment fund management system communicates one or more data messages to the mobile device (or to one or more servers which then communicate such data messages to the mobile device). Such data messages are commands generated by the component of the ticket voucher system and/or the component of the gaming establishment fund management system when the mobile device is detected in the NFC reader field. The processor of the mobile device communicates the data message to the mobile device application. The mobile device application responds, such as communicating a triggering message, and a communication channel is opened between the component of the ticket voucher system and/or the component of the gaming establishment fund management system and the mobile device application (or between the component of the ticket voucher system and/or the gaming establishment fund management system, one or more servers and the mobile device application). This open communication channel enables the component of the ticket voucher system and/or the component of the gaming establishment fund management system to send, though the NFC reader, additional data messages to the mobile device (or to the mobile device via one or more servers) which are responded to by the mobile device application of the mobile device. It should be appreciated that as long as the mobile device remains within the NFC field, the component of the ticket voucher system and/or the component of the gaming establishment fund management system is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the communication of data between the mobile device and the component of the ticket voucher system and/or the component of the gaming establishment fund management system. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the component of the ticket voucher system and/or the component of the gaming establishment fund management system, zero, one or more servers and a mobile device, such as secure pairing using one of these protocols. That is, in one embodiment, an NFC interface on a component of the ticket voucher system and/or the gaming establishment fund management system can be used to set-up a higher speed communication between the component of the ticket voucher system and/or the component of the gaming establishment fund management system, zero, one or more servers and the NFC enabled mobile device. The higher speed communication rates can be used for expanded content sharing. For instance, a NFC and Bluetooth enabled component of the ticket voucher system and/or the gaming establishment fund management system can be tapped by an NFC and Bluetooth enabled mobile device for instant Bluetooth pairing between the devices and zero, one or more servers. Instant Bluetooth pairing between a component of the ticket voucher system and/or the gaming establishment fund management system, an NFC enabled mobile device and zero, one or more servers, can save searching, waiting, and entering codes. In another example, a component of the ticket voucher system and/or the gaming establishment fund management system can be configured as an NFC enabled router, such as a router supporting a Wi-Fi communication standard. Tapping an NFC enabled mobile device to an NFC enabled and Wi-Fi enabled component of the ticket voucher system and/or the gaming establishment fund management system can be used to establish a Wi-Fi connection between the devices and zero, one or more servers.

In certain embodiments which implement a Wi-Fi, cellular and/or Bluetooth™ communications protocol, the system utilizes one or more QR codes generated by the component of the ticket voucher system and/or the component of the gaming establishment fund management system to facilitate the communication of data between the mobile device and the system. In such embodiments, the QR code is used to identify the component of the ticket voucher system and/or the component of the gaming establishment fund management system that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the component of the ticket voucher system and/or the component of the gaming establishment fund management system. In these embodiments, a communication tunnel wrapper (i.e., a Wi-Fi/Bluetooth™ tunnel wrapper) is utilized to establish a connection between the system and the mobile device and to transport any data messages described herein between the component of the ticket voucher system and/or the component of the gaming establishment fund management system, zero, one or more servers and the mobile device.

More specifically, in certain embodiments, the user requests, via an input at the component of the ticket voucher system and/or the component of the gaming establishment fund management system and/or the mobile device, the generation of a QR code by the component of the ticket voucher system and/or the component of the gaming establishment fund management system. In response to the user's request, the component of the ticket voucher system and/or the component of the gaming establishment fund management system displays a QR code. In certain embodiments, the QR code includes a nonce which prevents a third-party (e.g., another user) from sniping the user's login attempt. Such an on-demand QR code remains valid for a designated amount of time such that if the user does not scan the QR code within the designated amount of time, another QR code is necessary to be scanned to connect the mobile device to the component of the ticket voucher system and/or the component of the gaming establishment fund management system.

In these embodiments, the user scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the component of the ticket voucher system and/or the component of the gaming establishment fund management system, such as a new scanning of the QR code to send such a requested action from the mobile device to the component of the ticket voucher system and/or the component of the gaming establishment fund management system (or to send a requested action from the mobile device to one or more servers and then from one or more servers to the component of the ticket voucher system and/or the component of the gaming establishment fund management system).

In certain embodiments, following the scanning of a valid QR code, the mobile device application connects to one or more servers. In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the user and directs the user to rescan the QR code.

In addition to the connect command communicated from the mobile device application to the system, the mobile device application of these embodiments is configured to send a disconnect command to the system. Such a disconnect command functions to tear-down the connection the server. It should be appreciated that if the mobile device connection is severed before this command is received by the system, the sever sends this command on behalf of the mobile device application;

In another embodiment, the mobile device application is configured to send a trigger command to the system, such as a component of the ticket voucher system and/or the gaming establishment fund management system. In this embodiment, the trigger command is associated with an action requested by the user. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the user and enable the user to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the component of the ticket voucher system and/or the component of the gaming establishment fund management system.

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the component of the ticket voucher system and/or the component of the gaming establishment fund management system, such as a new tap of the mobile device to designated location(s) of the component of the ticket voucher system and/or the component of the gaming establishment fund management system. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the component of the ticket voucher system and/or the component of the gaming establishment fund management system, such as a new tap of the mobile device to designated location(s) of the component of the ticket voucher system and/or the component of the gaming establishment fund management system and other actions requested by the user via the mobile device application do not require any new engagement between the mobile device and the component of the ticket voucher system and/or the component of the gaming establishment fund management system.

It should be appreciated that while certain data or information pertaining to one or more of the requested actions are communicated between a component of the ticket voucher system and/or the gaming establishment fund management system and a mobile device, such data or information may additionally or alternatively be communicated: (i) between one or more servers and a mobile device via one or more wireless communication protocols, or (ii) between a component of the ticket voucher system and/or the gaming establishment fund management system and one or more servers via one or more wireless communication protocols and then from one or more servers to a mobile device via one or more wireless communication protocols.

It should additionally be appreciated that any functionality or process described herein may be implemented via one or more servers, a component of the ticket voucher system and/or the gaming establishment fund management system, or a mobile device application. For example, while certain data or information described herein is explained as being communicated from a component of the ticket voucher system and/or the gaming establishment fund management system to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a component of the ticket voucher system and/or the gaming establishment fund management system, such functions, features or processes may alternatively be performed by one or more servers, or one or more mobile device applications, (ii) while certain functions, features or processes are described herein as being performed by one or more mobile device applications, such functions, features or processes may alternatively be performed by one or more servers, or one or more components of the ticket voucher system and/or the gaming establishment fund management system, (iii) while certain functions, features or processes are described herein as being performed by one or more servers, such functions, features or processes may alternatively be performed by one or more components of the ticket voucher system and/or the gaming establishment fund management system, or one or more mobile device applications, and (iv) while certain functions, features or processes are described herein as being performed by one or more components of the ticket voucher system and/or the gaming establishment fund management system, such functions, features or processes may alternatively be performed by one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A device comprising:

a processor; and a memory device that stores a plurality of instructions that, when executed by the processor responsive to an occurrence of a ticket voucher redemption event, cause the processor to:

cause an issuance of a check to an identified user for an amount of funds associated with an anonymous ticket voucher that was issued by a ticket voucher system of a gaming establishment, and communicate data that results in the ticket voucher system updating an entry associated with the anonymous ticket voucher as redeemed for the check and not thereafter redeemable.

2. The device of claim 1, wherein the user is identified in association with a patron management system of the gaming establishment.

3. The device of claim 1, wherein the memory device stores a plurality of further instructions that, when executed by the processor, cause the processor to cause the issuance of the check to the identified user responsive to a determination that no check issuance limitation has been met.

4. The device of claim 3, wherein a first identified user is associated with a first check issuance limitation and a second identified user is associated with a second, different check issuance limitation.

5. The device of claim 1, wherein the amount of funds accounts for an amount of check processing fees.

6. The device of claim 1, wherein the check comprises an electronic check.

7. The device of claim 1, wherein the anonymous ticket voucher comprises a virtual ticket voucher.

8. The device of claim 1, wherein the check is issued in association with a printer supported by a housing of a kiosk.

9. A device comprising:

a processor; and a memory device that stores a plurality of instructions that, when executed by the processor, cause the processor to:

responsive to an occurrence of a fund withdrawal event associated with an amount of funds of a gaming establishment account associated with an identified user and following an authorization to withdraw the amount of funds from the gaming establishment account:

cause an issuance of a check to the identified user for the amount of funds, and cause a reduction, based on the amount of funds, of a balance of the gaming establishment account.

10. The device of claim 9, wherein the memory device stores a plurality of further instructions that, when executed by the processor, cause the processor to cause the issuance of the check responsive to a determination that no check issuance limitation has been met.

11. The device of claim 9, wherein the check comprises an electronic check.

12. The device of claim 9, wherein the processor is supported by one of a housing of an electronic gaming machine and a housing of a kiosk.

13. A method of operating a device, the method comprising:

responsive to an occurrence of a ticket voucher redemption event:

causing, by a processor, an issuance of a check to an identified user for an amount of funds associated with an anonymous ticket voucher that was issued by a ticket voucher system of a gaming establishment, and communicating data that results in the ticket voucher system updating an entry associated with the anonymous ticket voucher as redeemed for the check and not thereafter redeemable.

14. The method of claim 13, wherein the user is identified in association with a patron management system of the gaming establishment.

15. The method of claim 13, further comprising causing, by the processor, the issuance of the check to the identified user responsive to a determination that no check issuance limitation has been met.

16. The method of claim 15, wherein a first identified user is associated with a first check issuance limitation and a second identified user is associated with a second, different check issuance limitation.

17. The method of claim 13, wherein the amount of funds accounts for an amount of check processing fees.

18. The method of claim 13, wherein the check comprises an electronic check.

19. The method of claim 13, wherein the anonymous ticket voucher comprises a virtual ticket voucher.

20. The method of claim 13, wherein the check is issued in association with a printer supported by a housing of a kiosk.

* * * * *